May 23, 1939.　　　　　A. ALFORD　　　　2,159,649
CIRCUIT ARRANGEMENT FOR REDUCING TRANSIENTS
Filed Jan. 19, 1938　　2 Sheets-Sheet 1

INVENTOR
*ANDREW ALFORD*

BY
ATTORNEY

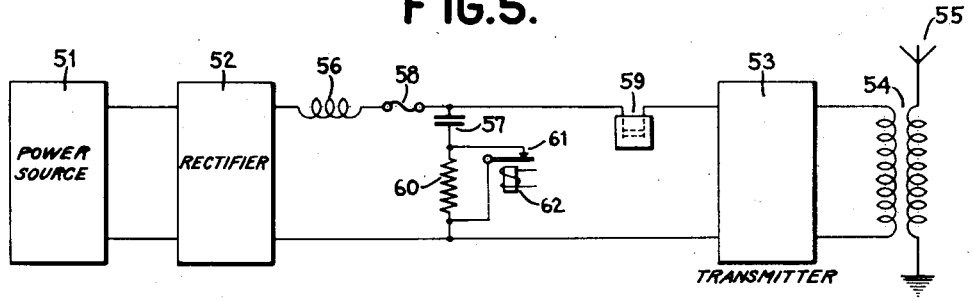
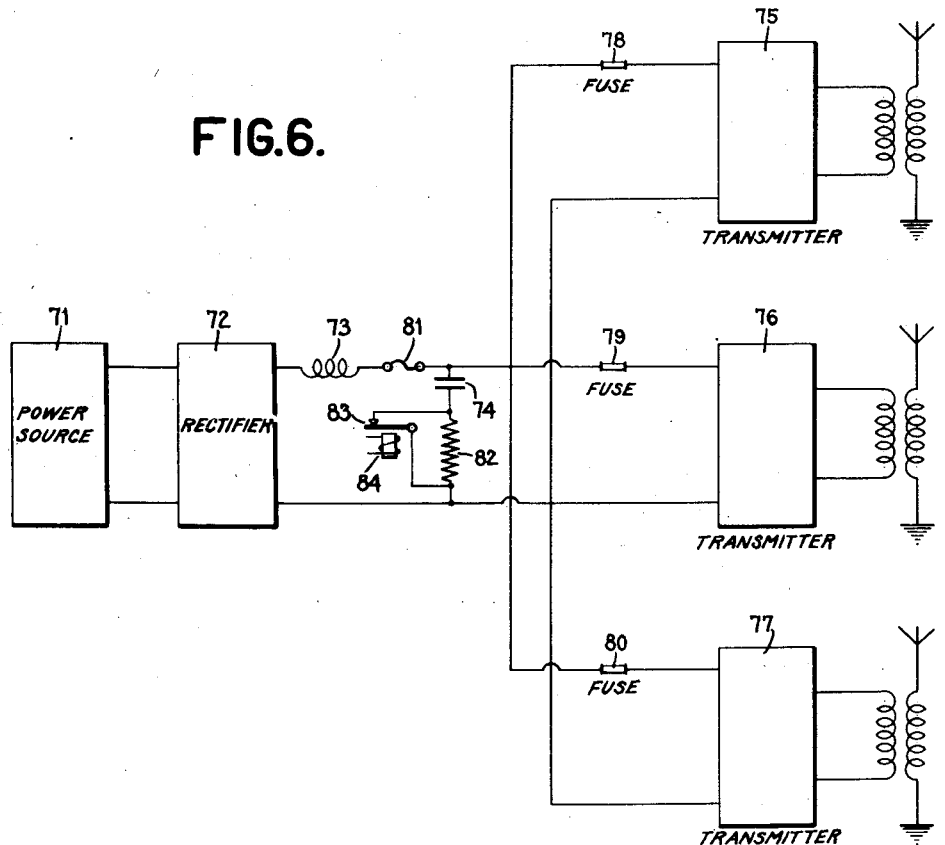

Patented May 23, 1939

2,159,649

UNITED STATES PATENT OFFICE 2,159,649

CIRCUIT ARRANGEMENT FOR REDUCING TRANSIENTS

Andrew Alford, San Mateo County, Calif., assignor to Mackay Radio & Telegraph Company, New York, N. Y., a corporation of Delaware Application January 19, 1938, Serial No. 185,681

15 Claims. (Cl. 250—17)

My invention relates to improved protective means and systems for use in circuits provided with high voltage rectifiers such as are commonly used with radio transmitters, and more particularly to protective means which reduce the harmful effects of transients in rectifier circuits.

It is the principal object of my invention to provide improvements in rectifier circuits for minimizing the disadvantageous effect of transients in the rectifier circuit caused by sudden changes in the condition of the circuit.

In high voltage supply circuits such as are commonly used for energizing high frequency transmitters, the power is derived from rectifiers and connected through suitable filters to a load. In order to minimize damage should a breakdown of the load cause a short circuit, a fuse is supplied between the load and the filter. It has been observed that even with such a fuse in the circuit the surges resulting from the transmitter breakdown often cause breakdown of other portions of the system, such as the filter condensers, and the rectifiers, thus causing more damage and greater loss of time in repairing the apparatus. The breakdown or arcing over of the rectifier generally results in opening of the circuit breakers of the power supply which is feeding the rectifiers and consequently a complete shut-down of this system.

Because of this danger of shut-down, it has been found undesirable to operate two or more transmitters from the same rectifier and power supply, since a breakdown of one transmitter might necessitate a complete shut-down of the transmission from all of the transmitters connected to the same power supply unit. Moreover, the surges which occur due to the breakdown of one transmitter will generally be great enough to cause the breakdown and consequent blowing of fuses in other transmitters connected in parallel therewith. This condition further aggravates the damages and consequently a preferred practice has been to use a separate rectifier and power supply unit for each transmitter, so as to maintain as much of the service as possible even though one transmitter should fail.

A further disadvantage in using two or more transmitters connected in parallel to the same rectifier unit, occurs when the circuit breakers from the power source are so related with the rectifier energizing circuit, as is often done in practice, that a substantial pause between the closing of the circuit breaker for energizing the rectifier cathodes and the operative connection of the rectifier circuit to the load occurs. In general the apparatus for obtaining such a pause or time delay is made automatic in operation so that the rectifiers will not be damaged by closing of the anode supply before the cathodes are sufficiently heated. However, it is clear that immediately after a blowing of the circuit breaker, the cathodes might be sufficiently heated so that the breaker circuit could be closed immediately. The automatic time delay feature does not distinguish in this respect, but operates with a fixed time interval and accordingly maintains the transmitters off the air for a longer period than may be necessary.

In accordance with a feature of my invention, I provide a fuse and filter circuit so proportioned that the fuse will blow before the surge resulting from the short circuit has risen to a great enough extent to cause the various types of damage outlined above. It is accordingly another object of my invention to provide a system wherein the transients caused by the short circuit of a load are prevented from reaching a value so high as to cause extensive amount of damage.

It is a further object of my invention to provide a filter circuit and associated fuse, the relationship between the values of the condenser and the fuse being such that the fuse will completely open the circuit in the time required to discharge the condenser due to a short circuit.

It is a still further object of my invention to provide a system wherein two or more separate transmitters may be coupled to the same rectifier output circuit with a minimum of danger that the whole system will be rendered inoperative due to the breaking down of the rectifier circuit.

It is a still further object of my invention to provide a novel fuse which will normally carry the power supply for the load means, but will break down or open the circuit in a very small fraction of a second, for example, of the order of a microsecond, due to the condenser discharge.

It is a still further object of my invention to provide a novel fuse which will permit sufficient heat radiation so that it will not melt under ordinary load conditions, but will carry a much larger load than is common in fuses of the same conductive area, but one which will be melted by a high current for a short period of time, due to the fact that the heating circuit is unable to dissipate the heat developed by such a high current even for a short interval.

It is further generally known that in closing of rectifier circuits large transient disturbances are impressed on the line which would ordinarily necessitate the construction of apparatus connected thereto so as to withstand a considerably higher voltage at the start than is present normally in operating the system. To reduce this surge effect, it has been suggested to insert resistance means in the main power supply line, feeding from the rectifier. A circuit breaker means controlled by relays may then be provided to close a circuit around the resistance when the transient has subsided to effectively remove the resistance from the circuit, so that the additional power loss through the resistance will not occur during the normal operation of the circuit. However, in these arrangements the resistance unit is included in the main line of the power supply and accordingly special relays are necessary to operate it, since it must break the main power supply circuit.

It is a further feature of my invention to insert a transient reducing resistance in the circuit at a point which the normal power supply does not traverse, and accordingly a much smaller and cheaper circuit breaking unit may be used therein. It is accordingly an object of my invention to provide a transient reducing means in accordance with the features outlined above.

It is a still further object of my invention to provide a transient reducing resistance in the condenser means connected across the main power supply line.

Other and further objects and features of my invention will be presented in the specific description of my invention made with reference to the accompanying drawings.

In order to more fully disclose my invention and explain its operation, several embodiments have been disclosed in the accompanying drawings, in which Fig. 1 illustrates an elementary circuit diagram used for explaining the principles of my invention;

Fig. 5 illustrates a transmitting system according to one embodiment of my invention applied to a radio transmitter;

Fig. 6 illustrates another transmission system according to my invention in which a plurality of transmitters are energized in parallel from a single power rectifier.

Figure 1:
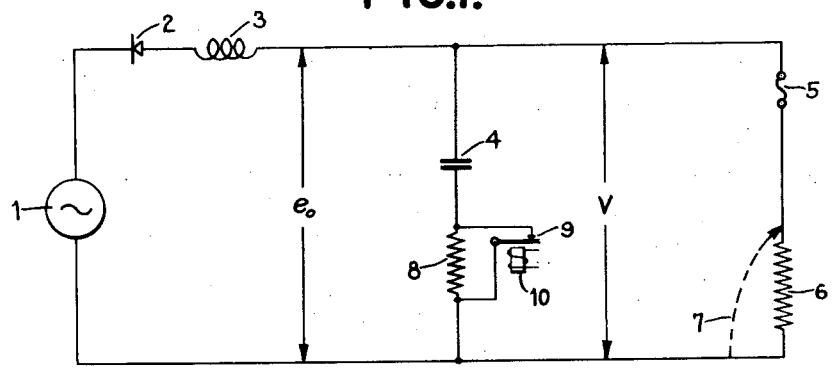

In order to more fully explain my invention, reference is first made to Fig. 1, which discloses diagrammatically a power supply circuit. In this figure is shown a generator 1, a rectifier 2, a filter circuit comprising an inductance 3 and a condenser 4, a fuse 5 and a load indicated generally at 6. In place of the fuse a suitable quick acting circuit breaker of other form may be used. It will, of course, be appreciated that in the normal circuit an alternating current power supply operates through a bank of rectifiers to provide the necessary plate supply for the transmitter. However, in connection with Fig. 1, the diagrammatic circuit is sufficient to describe the general operation of such an arrangement. The generator 1 may be considered as producing a voltage across the line equal to $e_0$, the inductance 3 has an inductance of L, the condenser 4 a capacity of C and the voltage across the condenser may be indicated by $v$. If a short or an arcing short such as indicated by arrow 7 occurs across the load 6, due to the breakdown, the condenser of course, first immediately discharges. The energy which has been stored in the condenser is dissipated in the cable, the fuse 5 and the short circuit 7. However, when ordinary circuits are used this discharge is not sufficient to cause a melting of the fuse 5. Consequently a current begins to build up through the choke coil 3 and continues to build up until the circuit is opened by a melting of the fuse 5. Since the current is continually building up in the choke coil 3, this current may reach a value in the order of 100 amperes before a breaking of the circuit occurs. Consequently a large amount of energy will be stored in the inductance 3 which will flow into the condenser as soon as the fuse is blown. The resulting voltage $v'$ across the condenser is very large and accordingly a flashback takes place which may result in a complete breakdown of the condenser, causing a further short circuit or an arcing over of the rectifier 2. Since the power rectifiers generally used may be gas filled or vapor type, breakdown of these tubes will usually occur due to excessive voltages. Simultaneously or shortly after the breakdown of the rectifier the line circuit breakers will open. However, the overload relays do not usually function until after all of the phenomena outlined above have occurred.

It can be seen from the statements outlined above that it is desirable to avoid these consequences. However, an increase of the size of inductance 3 will not produce the desired effect, since this merely results in a larger storing up of power therein. The making of the condenser 4 larger will help, but such an enlargement in order to be any material help, would necessitate the use of a condenser of such size as to be unfeasible. It accordingly appears that some other solution should be evolved.

In accordance with a feature of my invention, I proportion the condenser 4 and the fuse 5 so that the fuse will be blown by the discharge of the condenser. If we take W as the power or total energy necessary to melt the fuse, it is then only necessary to proportion condenser 4 so that it will discharge sufficient energy to accomplish this purpose. If the fuse blows out during the discharge of the condenser there will not be sufficient time for a large current to build up in the choke coil 3. During normal operation, that is, while carrying a continuous current, the temperature of the fuse depends on two factors, namely, the rate at which heat is supplied to the fuse, that is, $i^2R$ loss in the fuse, $R_f i^2$, where $R_f$ equals the resistance of the fuse and $i$ the current at normal voltage, and the rate at which heat is carried away from the fuse by convection, conduction and radiation. For a given current the rate at which heat is supplied to the fuse depends only on the resistance of the fuse. The rate at which the heat is carried away from the fuse depends upon several factors, such as the shape of the fuse wire, the nature of the surrounding medium, and so forth. The same fuse wire which surrounded by a small quantity of air trapped in a fibre tube will carry five amperes of direct current, will carry many times that current if it is surrounded by oil or placed in a draft of air. However, during the condenser discharge the time is so short that substantially no heat has time to leave the fuse wire, by convection or radiation, even if it is surrounded with oil or provided with other heat conducting means.

The result is that the temperature of the fuse at the end of the condenser discharge depends substantially entirely on the following factors.

(1) The energy thus delivered to the fuse during discharge which may be expressed as $$\frac{R_f}{r} \frac{V^2 C}{2}$$

where $R_f$ equals the fuse resistance, $r$ is the circuit resistance, $V^2$ is the voltage across the condenser and $C$ is the capacity of the condenser.

(2) The weight or mass of the fuse $M$.

(3) The specific heat capacity of the fuse wire $h$.

If the temperature at which the fuse wire melts is $T$ while the normal operating temperature of the fuse is $T_0$ then the work or energy $W$ for bringing the fuse to melting temperature neglecting heat losses due to conduction, convection and radiation, is $$W = (T - T_0) Mh$$

This assumption may be made when dealing with condenser discharges since the time is so short, in the order of a microsecond, that no substantial heat loss occurs. It can thus be seen that the melting of the fuse from a condenser discharge may be facilitated by three factors, namely, the increasing of the condenser capacity, the reduction of extraneous circuit resistances in series with the fuse, and by reducing the mass of the wires. While the energy $W$ as outlined above will bring the fuse wire to melting temperature, additional energy is needed to completely break the circuit. This should be sufficient to care for the latent heat of fusion of the wire and the heat required to vaporize the molten wire. Accordingly the amount of energy required to break the circuit $W'$ may be expressed $$W' = (T - T_0) Mh + MK$$

where $K$ is a constant depending on the latent heat of fusion of the wire and the amount of heat necessary to vaporize the molten wire. Accordingly I provide a circuit in which the condenser and the fuse are so proportioned relative to each other that the discharge of the condenser is sufficient to blow the fuse. Consequently the circuit is opened at a time of extremely low voltage or substantially zero voltage, thus reducing the resultant line surges to a minimum. While it is evident that no excessive surges will result so long as the condenser contains a sufficient charge under normal voltage conditions to blow the fuse, I prefer to so proportion the circuit that the quantity of electricity stored is only slightly greater than that needed to accomplish the desired purpose so that the circuit is opened at a time when the voltage is reduced to substantially zero or at least to a very small value. As a consequence, damage to the rectifier circuit is avoided and the connection of a plurality of transmitters to the same power supply is made feasible.

Upon closing of the rectifier circuit, transients are impressed on the line which although they are of smaller magnitude than those produced by a short circuit of the load, still are of considerable amplitude and therefore necessitate providing better insulating means in the condenser and likewise require a much more thorough complete insulation of the system for this higher voltage. Accordingly, in order to keep these transients at a lower value, it has been proposed to insert a resistance unit in series with the line at a point on either side of inductance 3. However, it is not economical to operate with this resistance continually in the line and accordingly means have been proposed for short circuiting this resistance as soon as the transients have subsided to a substantially low value. Accordingly the short circuiting contacts are provided across the resistance and a relay is provided for operating these contacts so as to close them as soon as the transients are reduced to a sufficient extent. The circuits such as proposed above and for operating such relays are known, and form no part of this invention, and accordingly no complete illustration is made. The control relays might be operated directly from some of the windings of the filter itself, or might be provided as connected to the proper point in the input or output of the filter as desired.

It can be readily seen that while such an arrangement as that outlined above may produce the desired results in reducing the amplitude of the transients, still the conductors and contacts must carry the full load and consequently must be quite large. Moreover, since they carry the full line current, a circuit control relay of relatively large size must be provided to control the line breaking contacts about the resistance.

In accordance with my invention I provide a means for reducing the harmful transients due to the closing of the rectifier circuit or similar causes, which does not carry the full line current and consequently does not need a large relay to operate it. This arrangement is also shown in Fig. 1. In series with condenser 4 is provided a resistance 8 and around this resistance is provided short circuiting contacts 9 which are controlled by a relay indicated generally at 10, operated from any suitable source. Since the surge effect which occurs when the rectifier is connected to the circuit is due to the filter elements and the oscillation produced therein, it is clear that the resistance 8 inserted in circuit with condenser 4 will serve to reduce the magnitude of these transients. However, after the circuit has reached its steady state and the transients have subsided, it is not desirable to have the resistance in the circuit. Accordingly I provide the short circuiting means 9 controlled by relay 10 for short circuiting this resistance once the circuit has reached a stable state. Accordingly the resistance is cut out of the filter circuit and only the residual ripple current due to the rectifier output then traverses this conductor and the condenser. The short circuiting of the resistance 8 not only produces desirable operating characteristics in the filter circuit, but reduces the external resistance of the fusing circuit so that the inherent resistance of that circuit is kept small with respect to the resistance of the fuse itself.

While the fundamental principle of my invention is applicable to generator circuits of the type generally indicated in Fig. 1, in which the fuse 5 is properly chosen so as to carry the normal overload current of the system, but by reason of its design, together with the choosing of the condenser 4 of a proper size relative to the fuse so that the fuse will be melted by the discharge of the condenser, I prefer to use a new fuse element designed in accordance with my invention to more readily provide the desirable characteristics.

Figure 2:
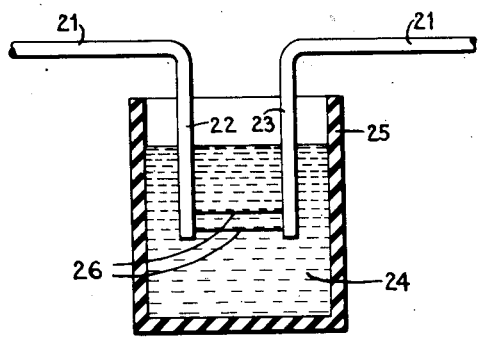
Fig. 2 illustrates one form of fuse in accordance with my invention.

In Fig. 2 is shown one form of novel fuse in accordance with my invention. In this figure, 21 represents the transmission line which may comprise the ordinary wire used in the transmission line. This line is connected to conductors 22, 23 which are immersed in oil 24 contained in an insulating container 25. Between the two conductors 22, 23 are provided a plurality of fine fusible wires 26. The distance between wires 22, 23 may be made quite small, it being necessary only that the distance be so short that arcing discharge between these conductors will not occur at the operating voltage used in the circuit. While I prefer to strand the fusible wires as indicated in the illustration to increase the heat radiation and convection surface of the wires, it is clear that any form of fuse wire may be used as long as the cooling is sufficient to enable the fuse to carry normal line current, and the conductors are made of such resistance and mass as to melt due to the large current of short duration caused by condenser discharge.

In one test of a fuse made in accordance with this disclosure, the oil used consisted of ordinary transformer oil and the two fusible wires 26, each 1 and ½" long and .0023" in diameter were used. This fuse carried more than 11 amperes of direct current, but blew out on a condenser discharge and avoided all serious transients in the rectifier circuit. It is preferable that the insulated container 25 be made of some fibrous insulating material rather than a ceramic material, since the shock or explosion due to the fusing of the metal wires is quite sharp and may cause a shattering or fracturing of a ceramic container. However, while the explosion is relatively sharp it is of very small magnitude and will not cause any violent explosion.

Figure 3:
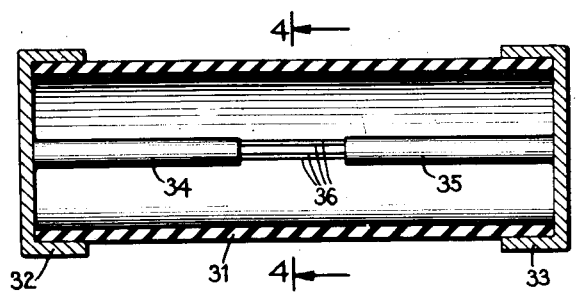
Fig. 3 illustrates another form of fuse in accordance with my invention.
Figure 4:
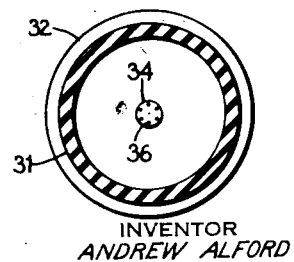
Fig. 4 is a cross sectional view taken on line 4—4 of Fig. 3.

In Figs. 3 and 4 is illustrated another embodiment of my invention using an air cooled fuse instead of the oil cooled fuse. In these figures the fuse is contained in a fibre case 31 closed at the ends with metal caps 32, 33. Fastened to the inner side of the metal caps are heavy conductors 34, 35 which serve as means for connecting the fuse wires 26 into the line or circuit. The fuse wires 36 are made relatively fine and the distance between the conductors 35 and 36 need be chosen only slightly greater than the distance over which an arc discharge would occur in the circuit, due to point discharge between 34 and 35 after the fuse 36 has been melted. The dividing of the fuse wire into a plurality of parts, as shown, facilitates the dissipation of heat by radiation in the normal operating condition, as well as permitting convection air currents to circulate around the separate strands. Furthermore, the air chamber within the cartridge 31 is made relatively large so as to permit the circulation of air within the compartment, thus serving to aid the dissipation of the heat. If a completely enclosed cartridge is not desired, openings may be made in the casing 31 to facilitate convection of air through the container and if desired some means may be provided for continuously blowing air through the cartridge over the fuse wires 36 to facilitate the maintenance of the temperature at a low value under normal conditions. However, when the large current from a condenser discharge is forced through the fuse wires 36, they are melted by this discharge current since there is not sufficient time for a dissipation of the large amount of heat produced therein.

In Fig. 5 is illustrated one practical embodiment of my invention applied to a transmitting system. In this figure the power source 51 is shown connected to a rectifier 52. The output of the rectifier is connected through a filter circuit and fuse to load 53, which may be a vacuum tube transmitter. The transmitter is connected over transformer 54 to a radiating antenna 55. It should be clearly understood that other forms of transmitting means other than by radiation may be used since the type of load is not material in so far as the operation of my invention is concerned. The filter circuit comprises an inductance means 56 and a condenser 57, connected across the transmission line. A standard fuse 58 is connected in the transmission line at a point between the inductance 56 and the point of connection of the condenser so that its added resistance will not be included in the transmission line between the condenser and the load. In series with condenser 57 is provided a resistance 60, about which is arranged a short circuiting conductor provided with contacts 61. A relay 62 is provided for controlling contacts 61 for the purpose fully outlined in connection with Fig. 1. A second fuse 59 is provided in the transmission line between the condenser and the load circuit. This fuse is preferably of a type such as illustrated in Figs. 2 or 3 and 4, but may be of some other type which is designed to carry the normal load current without undue overheating, but is adapted to melt readily upon the application of high currents for a short period of time, so as to be capable of ready melting due to the discharge of condenser 57. The standard fuse 58 is provided in the circuit to serve as additional protection in event of a failure of the fuse 59 to properly operate. Furthermore, the inclusion of standard fuse such as 58 may in certain cases be required by the fire underwriters. However, this fuse should preferably be connected in a part of the circuit so as to maintain the resistance of the loop circuit including the condenser 57 and the fuse 59 at as low a value as possible relative to the fuse resistance discharge. It should be distinctly understood that while I have disclosed only two elements, namely, the inductance 56 and condenser 57 in the filter circuit, that the circuit may comprise a much more complex network as is used in some cases. However, in any event, the condenser 57 should be provided at the output end of the filter network so that no other impedance elements are interposed between it and the fuse. While the circuit may still operate in accordance with the disclosure of my invention, if this precaution is not taken, such a circuit will require a larger condenser or a more easily melted fuse, or both, in order to compensate for any added resistance. It is therefore preferable to keep the resistance of this part of the circuit as low as feasible.

It is clear that the circuit as disclosed in connection with Fig. 5 reduces transient surges which might cause damage to the system. The fuse arrangement provides a system which will open the circuit upon transmitter failure which causes a short circuit across the line. The resistance 60 likewise serves to reduce surges to a smaller value and relay 62 operates upon an increase of current to insert this resistance into the circuit whenever a predetermined minimum is exceeded. Thus these arrangements, in accordance with my invention, reduce the cost of construction of a transmitter circuit by making it unnecessary to insulate for voltages much higher than those normally used and renders the circuit less liable to breakdown.

In Fig. 6 I have illustrated another practical embodiment of my invention applied to a circuit wherein two or more transmitters are connected to a common plate supply filter. In this figure, 71 represents a power supply coupled to a rectifier 72 and through a filter circuit comprising inductance 73 and condenser 72 to three separate output transmitters 75, 76 and 77. A master fuse 81 is provided, preferably outside the condenser load circuit for purposes outlined in connection with the circuit described with reference to Fig. 5. In the branch circuit of each of these transmitters is provided a fuse indicated at 78, 79 and 80. Each of these fuses is proportioned with respect to condenser 74 so that the fuse will be melted by the discharge of the condenser. Because of this particular proportioning of the various parts, it is feasible to connect two or more transmitters to the same power supply unit. Thus, if, for example, transmitter 76 flashes over and thus short circuits the line, the condenser 74 in discharging will melt the fuse 79 before sufficient current is built up in inductance 73 to damage the rectifier or to impart a damaging surge on either of transmitters 75 or 77 so as to cause the breakdown of these transmitters and the blowing of their respective fuses 78 and 80. Serially connected with condenser 74 is provided a resistance element 82, around which is arranged short circuiting conductors, closed through contacts 83 during normal operation. A suitably controlled relay 84 is provided for opening contacts 83 in response to an increase in current to a value a predetermined amount greater than normal, so as to insert resistance into circuit for reducing the amplitude of transient surges.

While, throughout the specification, I have described the preferred form of my invention in which a fuse is used to open the circuit in case of a short circuit, it should be understood that other suitable forms of quick acting circuit breakers may be used. In order to secure the desired advantages, any such circuit breaker should be very quick acting so that it operates in response to the energy discharged from the condenser to open the circuit before the current has built up appreciably through the filter inductance.

While I have disclosed my invention only with reference to certain specific embodiments, I do not intend this description to limit the scope of my invention to these particular systems illustrated. What I consider to be my invention and the scope thereof is defined in the appended claims.

What I claim is:

1. An electric circuit arrangement comprising a power line for operating under normal load conditions, an energy storing condenser and a load connected to said line, and a circuit breaker in said line between said condenser and said load, the size of said condenser being such that the energy stored therein under normal conditions is sufficient to open said circuit breaker upon a short circuit at said load.

2. An electric circuit arrangement comprising a power line having an inductive reactance and a circuit breaker serially connected therein, a load connected to said line adjacent to said circuit breaker, and a condenser connected across said line between said inductances and said circuit breaker, said condenser being of such size that the energy stored therein under normal circuit operating conditions is sufficient to open said circuit breaker upon a short circuit of said load.

3. An electric circuit arrangement in accordance with claim 2, in which said circuit breaker comprises a fuse so designed as to open the circuit by melting upon discharge of the energy stored in said condenser, through said fuse.

4. In combination, a power source, a rectifier connected to said power source for supplying rectified power of a predetermined potential, a transmission line coupled to the output of said rectifier, a filter in said transmission line comprising an inductance means in series with said line and a condenser means connected across said line, a load connected to said transmission line at a point beyond said filter, fuse means in said transmission line between said load and said filter, said fuse means having such a mass and being so proportioned with respect to said condenser means that a discharge of said condenser at said predetermined potential through said fuse means will effect a melting of said fuse whereby the power circuit to said load will be opened.

5. The combination according to claim 4, further comprising resistance means in the connections of said condenser for reducing the effects of transients due to initial energization of said rectifier, and relay means for short circuiting said resistance means in response to reduction of the transients to substantially minimum value for operating said short circuiting means.

6. In a power supply circuit, a source of direct current power output for producing power at normal line potential, a smoothing filter in the output of said source comprising inductive means and capacity means, a load connecting means between said filter and said load, a protective fuse in said connecting means, said fuse being connected directly between said capacity means and said load, said capacity means and said fuse being so proportioned relative to each other that the discharge of said capacity after charging at normal line potential due to a short circuit in said load is sufficient to open the circuit at said fuse.

7. A protective system for a high voltage supply circuit comprising a high voltage rectifier for supplying power at normal voltage, a load circuit, a transmission line connecting said rectifier and said load, a filter in said transmission line comprising a series connected inductance means in said transmission line and a shunt connected condenser connected between said transmission line conductors at a point between said load and said inductance means, means for reducing initial transient voltage surges comprising a resistance in series connection with said condenser, means responsive to reduction of said initial surge to normal for short circuiting said resistance, and a fuse in said transmission line for protecting said system from surges due to short circuits in said load, said fuse comprising fusible conductors of small mass provided with sufficient surface to readily dissipate heat due to normal load conditions, said fusible conductors being of such mass and proportions relative to said condenser as to be fusible by the current discharged from said condenser when charged at said normal voltage, the length of said fusible wires slightly exceeding the distance for point discharge at normal voltage supply.

8. A protective system for a high voltage supply circuit comprising a high voltage rectifier for supplying power at normal voltage, a load circuit, a transmission line connecting said rectifier and said load, a filter in said transmission line comprising a series connected inductance means in said transmission line and a shunt connected condenser connected between said transmission line conductors at a point between said load and said inductance means, means for reducing initial transient voltage surges comprising a resistance in series connection with said condenser, and means responsive to reduction of said initial surge to normal for short circuiting said resistance.

9. A protective system for a high voltage supply circuit comprising a high voltage rectifier for supplying power at normal voltage, a load circuit, a transmission line connecting said rectifier and said load, a filter in said transmission line comprising a series connected inductive means in said transmission line and a shunt connected condenser connected between said transmission line conductors at a point between said load and said inductance means, and a fuse in said transmission line for protecting said system from surges due to short circuits in said load, said fuse comprising fusible conductors of small mass provided with sufficient surface to readily dissipate heat due to normal load conditions, said fusible conductors being of such mass and proportions relative to said condenser as to be fusible by the current discharged from said condenser when charged at said normal voltage, the length of said fusible wires slightly exceeding the distance for point discharge at normal voltage supply.

10. A protective system according to claim 9, in which said load comprises a high frequency transmitter.

11. In a high voltage system, a direct current power source for producing a normal voltage output, a filter in the output of said power source comprising a condenser connected across the filter output, a plurality of transmitters connected in parallel with said filter output, and a circuit breaker in each of said transmitter circuits, each of said circuit breakers being so proportioned relative to said condenser as to open said circuit in response to said condenser discharge when charged at said normal voltage.

12. A high voltage system according to claim 11, in which each of said circuit breakers comprises a plurality of strands of fusible wire supported in a fluid medium.

13. In combination, a high voltage, direct current source, a filter in the output of said source, said filter comprising inductance means and capacity means tending to produce surge disturbances upon initial energization from said source, means for minimizing said disturbances comprising a resistance means connected in said filter in series with the capacity means, and means responsive to recession of said surge disturbances to a substantial minimum for short circuiting said resistance.

14. In a high voltage, high power system which produces surge disturbances upon initial energization comprising a source of high frequency, high voltage energy connected to a load, a transmission line for interconnecting said source and said load, a filter in said transmission line comprising inductance means in series in said line and condenser means connected across said transmission line, and means for reducing the amplitude of said initial surges comprising a resistance in series with said condenser means, short circuiting connections adapted to short circuit said resistance under normal operating conditions, and means responsive to said surge disturbances for opening said short circuiting connections, whereby the effect of said surge disturbances is reduced.

15. A high voltage, high power system according to claim 14, in which said condenser means is arranged at a point in said filter adjacent said load, further comprising a fuse in said transmission line, said fuse and said condenser being so related relative to each other in size that the fuse will be melted upon discharge of said condenser caused by a short circuit at said load.

ANDREW ALFORD.